US010584834B2

(12) United States Patent
Williams (10) Patent No.: US 10,584,834 B2
(45) Date of Patent: Mar. 10, 2020

(54) REMOVABLY MOUNTABLE LIGHTING MODULE SYSTEM AND METHOD

(71) Applicant: Alivia Williams, Nashville, TN (US)

(72) Inventor: Alivia Williams, Nashville, TN (US)

( * ) Notice: Subject to any disclaimer, the term of this patent is extended or adjusted under 35 U.S.C. 154(b) by 0 days.

(21) Appl. No.: 15/678,377

(22) Filed: Aug. 16, 2017

(65) Prior Publication Data

US 2019/0056075 A1 Feb. 21, 2019

(51) Int. Cl.
*F21L 4/08* (2006.01)
*F21V 23/06* (2006.01)
*F21V 21/092* (2006.01)
*H02J 7/00* (2006.01)
*F21Y 115/10* (2016.01)

(52) U.S. Cl.
CPC ............ *F21L 4/08* (2013.01); *F21V 21/0925* (2013.01); *F21V 23/06* (2013.01); *H02J 7/0044* (2013.01); *H02J 7/0068* (2013.01); *F21Y 2115/10* (2016.08)

(58) Field of Classification Search
CPC .... F21L 4/08; F21L 4/085; F21L 4/027; H02J 7/0044; H02J 7/0068; F21V 21/0925; F21V 23/06; F21V 21/092; F21V 23/003; F21Y 2115/10
See application file for complete search history.

(56) References Cited

U.S. PATENT DOCUMENTS

| 5,414,405 | A | 5/1995 | Hogg et al. | |
|---|---|---|---|---|
| 5,673,989 | A * | 10/1997 | Gohl | B60Q 1/076 362/286 |
| 6,883,930 | B2 | 4/2005 | Saban et al. | |
| 6,963,275 | B2 | 11/2005 | Smalls | |
| 7,021,785 | B2 | 4/2006 | Rubin | |
| 7,325,944 | B2 * | 2/2008 | Kovacik | F21L 4/08 362/196 |
| 7,744,246 | B2 | 6/2010 | Rizkin et al. | |
| 8,142,045 | B2 * | 3/2012 | Peak | B60Q 7/00 362/183 |
| 8,164,304 | B2 * | 4/2012 | Gardner | H02J 7/0044 320/107 |
| 8,167,450 | B2 | 5/2012 | Hudson | |
| 8,246,223 | B2 | 8/2012 | Ford | |
| 8,967,824 | B2 | 3/2015 | Hootman et al. | |

(Continued)

OTHER PUBLICATIONS

Innovative Lighting—Amazon. Innovative Lighting Portable LED Bow Light with Suction Cup. Amazon. Pub. Date: May 12, 2017. US.

(Continued)

*Primary Examiner* — Peggy A Neils
(74) *Attorney, Agent, or Firm* — Nyman IP LLC; Scott Nyman (57) ABSTRACT

A removably mountable lighting module system is provided for illuminating a space using removably mountable lighting modules. The removably mountable lighting module system may include a lighting module and dock base. The lighting module may include a lighting module enclosure, light source component, base component, electrical component, and mounting component. The dock base may include a lighting module receiving interface with an electrical component, dock base holding connector, and dock base enclosure component. A method to operate an lighting module for illuminating a space is also provided.

18 Claims, 7 Drawing Sheets

(56) References Cited

U.S. PATENT DOCUMENTS

| | | |
|---|---|---|
| 9,086,194 B2 | 7/2015 | Eibner et al. |
| 9,109,769 B2 | 8/2015 | Lee |
| 9,287,730 B2* | 3/2016 | Miller .................. H02J 7/0027 |
| 9,568,171 B1* | 2/2017 | Grider ................. F21V 21/0965 |
| 10,001,252 B2* | 6/2018 | Inskeep ................ H02J 7/0052 |
| 2005/0201084 A1 | 9/2005 | Huang |
| 2008/0106891 A1* | 5/2008 | Lee ......................... F21L 4/085 |
| | | 362/183 |
| 2009/0090342 A1 | 4/2009 | Freitag et al. |
| 2012/0275141 A1 | 11/2012 | Keith |
| 2014/0078724 A1 | 3/2014 | Bendit |
| 2016/0215966 A1* | 7/2016 | Heller .................... A45D 44/04 |
| 2016/0341379 A1 | 11/2016 | Hoffman |
| 2017/0205058 A1* | 7/2017 | Ostrander ........... F21V 21/0885 |
| 2017/0303373 A1* | 10/2017 | Vicknair .................. A47G 1/00 |
| 2019/0011089 A1* | 1/2019 | Whiting ................. F21L 4/027 |

OTHER PUBLICATIONS

SeaChoice—Amazon. SeaChoice Portable Battery Stem Suction Cup Light. Amazon. Pub Date: May 12, 2017. US.

PR Newswire. Larson Electronics' Magnalight Announces New Combination Mount LED Beacon. Pub Date: Oct. 11, 2011. US.

* cited by examiner

REMOVABLY MOUNTABLE LIGHTING MODULE SYSTEM AND METHOD

FIELD OF THE INVENTION

The present disclosure relates to a removably mountable lighting module system. More particularly, the disclosure relates to illuminating a space using removably mountable lighting modules.

BACKGROUND

People often interact with others at social gatherings, professional events, and other occasions. Often, these gatherings require that an attending person be presentable. Looking professional or appropriate for an event requires getting ready, grooming, and otherwise cleaning up. For most people, this includes spending time in front of a mirror or vanity.

When traveling for business, vacation, or otherwise, people often have little to no control over the lighting for a mirror, vanity, or other location where the person may get ready. For example, a person traveling for business may stay in a hotel room. This hotel may have inadequate lighting to properly groom and get ready for a professional meeting. Until now, a person desiring supplemental lighting would be required to bring a large lamp, bulky vanity set, or another unwieldy accessory. Additionally, traveling with such an undesired accessory may add to travel costs or even be banned on a required transportation mode, such as an airplane.

Therefore, a need exists to solve the deficiencies present in the prior art. What is needed is a lighting module installable to a surface to illuminate a space. What is needed is an energy efficient lighting module with a mounting interface. What is needed is a power storing lighting module that is rechargeable. What is needed is a lighting module attachable to a surface using suction. What is needed is a lighting module includable in a docking base for carrying and group charging. What is needed is a method of removably mounting and operating a lighting module. What is needed is a method of illuminating a space using removably installable lighting modules.

SUMMARY

An aspect of the disclosure advantageously provides a lighting module installable to a surface to illuminate a space. An aspect of the disclosure advantageously provides an energy efficient lighting module with a mounting interface. An aspect of the disclosure advantageously provides a power storing lighting module that is rechargeable. An aspect of the disclosure advantageously provides a lighting module attachable to a surface using suction. An aspect of the disclosure advantageously provides a lighting module includable in a docking base for carrying and group charging. An aspect of the disclosure advantageously provides a method of removably mounting and operating a lighting module. An aspect of the disclosure advantageously provides a method of illuminating a space using removably installable lighting modules.

Accordingly, the disclosure may feature a lighting system including at least a lighting module. The lighting module may include a light source component, an electrical component, and a base component. The lighting module may include a light source component to selectively emit light and oriented to direct the light away from a mounting face of a surface upon which the lighting module is mounted. The electrical component may include a battery to store electrical power, a charging interface to receive the electrical power for storage by the battery, and power control circuitry to manage storing and extracting the electrical power via the battery. The base component may be operatively attached to the light source component. At least part of the electrical component may be installable in the base component. The mounting component may be operatively attached to the base component for removably mounting the lighting module to the surface.

In another aspect, the lighting system may include a dock base. The dock base may include a lighting module receiving interface about a bottom interior dock base surface of the dock base. The dock base may additionally include a dock enclosure substantially encompassing an interior dock space accessible via a dock enclosure access interface.

In another aspect, the dock base may include a dock charging connector integrated into the lighting module receiving interface of the dock base. The dock base may additionally include dock power control circuitry to at least provide the electrical power to the lighting module received by the lighting module receiving interface. Furthermore, the dock base may include a dock power connection to receive the electrical power for the dock base from an external power source.

In another aspect, the dock base may include a dock battery to store at least part of the electrical power providable to the lighting module operatively connected to the lighting module receiving interface.

In another aspect, the dock base may include a dock base holding connector to substantially keep the lighting module received by the dock base to the dock base. The lighting module substantially kept by the dock base holding connector may also be removable from the dock base holding connector.

In another aspect, the charging interface may be at least partially compatible with a universal serial bus standard.

In another aspect, an enclosure may be provided including at least a light source enclosure and a base enclosure. The light source enclosure may include the light source component. The light emitted by the light source component may be at least partially transmittable through the light source enclosure. The base enclosure may include at least part of the electrical component. The mounting component may be installable to the base component. The light source enclosure may be operatively attachable to the base enclosure.

In another aspect, the mounting component may include a suction cup.

According to an embodiment of this disclosure, a lighting system is provided including a lighting module and a dock base. The lighting module may include a light source component, an electrical component, a base component, and a mounting component. The light source component may selectively emit light. The electrical component may include a battery to store electrical power, a charging interface to receive the electrical power for storage by the battery, and power control circuitry to manage storing and extracting the electrical power via the battery. The base component may be operatively attached to the light source component. At least part of the electrical component may be installable in the base component. The mounting component may be operatively attached to the base component for removably mounting the lighting module to a surface. The dock base may include a lighting module receiving interface about a bottom interior dock base surface of the dock base. The dock base may additionally include a dock enclosure substantially encompassing an interior dock space accessible via a dock enclosure access interface. The dock base may include a dock charging connector integrated into the lighting module receiving interface of the dock base. Furthermore, the dock base may include dock power control circuitry to at least provide the electrical power to the lighting module received by the lighting module receiving interface.

In another aspect, the dock base may further include a dock battery to store at least part of the electrical power providable to the lighting module operatively connected to the lighting module receiving interface.

In another aspect, the dock base may include a dock base holding connector to substantially keep the lighting module received by the dock base to the dock base. The lighting module being substantially kept by the dock base holding connector also being removable from the dock base holding connector.

In another aspect, the light source component may include a light emitting diode oriented to direct the light away from a mounting face of the surface upon which the lighting module is mounted.

In another aspect, an enclosure may be provided including a light source enclosure and base enclosure. The light source enclosure may include the light source component. The light emitted by the light source component being at least partially transmittable through the light source enclosure. The base enclosure may include at least part of the electrical component. The mounting component may be installable to the base component. The light source enclosure may be operatively attachable to the base enclosure.

In another aspect, the mounting component may include a suction cup.

According to an embodiment of this disclosure, a method is provided for removably mounting and using a lighting system comprising a lighting module. The method may include (a) removably mounting the lighting module that includes a light source component, a base component, and a mounting component by operatively attaching the mounting component to a mounting face of a surface. The method may additionally include (b) engaging an electrical component that includes a battery for storing electrical power, a charging interface for receiving the electrical power, and power control circuitry for managing and extracting the electrical power via the battery to drive the light source component. The method may further include selectively emitting light away from the mounting face. The base component may be operatively attached to the light source component. The mounting component may be operatively attached to the base component for removably mounting the lighting module to the surface.

In another aspect, the method may include before step (a): (d) removing the lighting module from a dock base that includes a lighting module receiving interface about a bottom interior dock base surface of the dock base.

In another aspect, the method may include (e) while the lighting module is held by the dock base including a dock charging connector integrated into the lighting module receiving interface: (i) providing the electrical power to the lighting module received by the lighting module receiving interface via dock power control circuitry, and (ii) receiving the electrical power for the dock base from an external power source.

In another aspect, the method may include (f) storing at least part of the electrical power via a dock battery providable to the lighting module operatively connected to the lighting module receiving interface.

In another aspect, the method may include (g) substantially keeping the lighting module received by the dock base to the dock base via a dock base holding connector. The lighting module substantially kept by the dock base holding connector is selectively removable from the dock base holding connector.

In another aspect, the mounting component may include a suction cup. Step (a) of the method may include removably mounting the suction cup to the mounting face of the surface.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings in which like numerals represent like components.

DETAILED DESCRIPTION

The following disclosure is provided to describe various embodiments of a removably mountable lighting module system. Skilled artisans will appreciate additional embodiments and uses of the present invention that extend beyond the examples of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

Various aspects of the present disclosure will now be described in detail, without limitation. In the following disclosure, a removably mountable lighting module system will be discussed. Those of skill in the art will appreciate alternative labeling of the removably mountable lighting module system as a lighting system, modular vanity lighting system, modular lighting device, lighting device, suction light, the invention, or other similar names. Similarly, those of skill in the art will appreciate alternative labeling of the removably mountable lighting module system as a lighting operation using removably mountable lighting modules, suction mounting for lighting a space, illumination using lighting modules, lighting operation, method, operation, the invention, or other similar names. Skilled readers should not view the inclusion of any alternative labels as limiting in any way.

The disclosure generally relates to a lighting module that is movable between a dock base, which may be used as a carrying case, and various attachable surfaces. In its simplest embodiment, the lighting device is a module with a light source component and power supplying electrical component included by an enclosure, a mounting interface, and optionally charging connection for a compatible lighting module receiving interface of the dock base, which may be used as a charging plate. In use, multiple lighting modules may be carried in a dock base. The lighting modules may hold an electrical charge sufficient to drive a switchable light source, such as one or more light emitting diodes ("LEDs"). The lighting modules may be removed from the dock base and temporarily attached to a surface, for example, be stuck to a mirror by suction cups. The lighting modules may provide supplemental light for a user while getting ready to go out or attend a public event.

A device included by this disclosure may include multiple lighting modules, which may be stored and transported in a dock base, for example, as a carrying case. A lighting module receiving interface may be included in the dock base, which may charge multiple lighting modules substantially simultaneously. The lighting module receiving interface may optionally be removable from the dock base. The lighting module may additionally be provided without an accompanying dock base, in some embodiments.

Referring now to FIGS. 1-8, the removably mountable lighting module system will now be discussed in more detail. The removably mountable lighting module system 100 may include a lighting module 110, lighting module enclosure component, light source component 112, base component 130, lighting module electrical component 120, mounting component 140, dock base 150, dock base electrical component, dock enclosure component, and additional components that will be discussed in greater detail below. The removably mountable lighting module system 100 may operate one or more of these components interactively with other components to illuminate a space using removably mountable lighting modules 110.

Throughout this disclosure, various embodiments of a lighting module 110 and associated dock base 150 will be discussed. Intended applications include, without limitation, providing a portable lighting module 110 that may be removably mounted to a mirror, vanity, or other location to assist with preparing or getting ready by illuminating a space. Those of skill in the art will appreciate additional uses for the lighting module 110, associated dock base 150, and other aspects of this disclosure, without limitation. For example, the lighting module 110 may be placed virtually anywhere that additional light is desired, such as a kitchen, workshop, bedroom, office, and/or other location that would be apparent after having the benefit of this disclosure.

The lighting module will now be discussed in greater detail. FIGS. 1-6 highlight examples of the lighting module 110, which may also be shown in other figures. The lighting module 110 may include various aspects to facilitate removably mounting the lighting module 110 to a surface 148 to increase the Illumination in a space. In one embodiment, the lighting module 110 may include a base component 130, light source component 112, electrical components 120, mounting components 140, and/or other features. The light source component 112 may be operatively attached to the base component 130, such to substantially protect electrical components 120 and/or other aspects. A base seal 132 may optionally be included between the base component 130 and the light source component 112 to substantially reduce the likelihood of moisture or other environmental hazards entering the lighting module 110.

The lighting module 110 may additionally include a mounting component 140 to facilitate removably attaching the lighting module 110 to a surface 148. The lighting module 110 may be configured to emit light in a direction towards a user, which may also be away from the surface 148 on which the lighting module 110 is mounted. For example, a lighting module 110 including a suction cup 142 attached to the base component 130 may emit light from the light source component 112 in a direction opposite to the direction of attachment. The various components of an illustrated lighting module 110 will be discussed below in greater detail, without limitation.

The lighting component may be configured to be received by a dock base 150, which may provide a secure storage and/or carrying location. Additionally, the dock base 150 may provide electrical power to the lighting modules 110 included by the dock base 150 for added convenience. For example, the dock base 150 may receive and store multiple lighting modules 110 that can be charged by the dock base 150 using a common connection to an external electrical power supply.

The lighting module enclosure component will now be discussed in greater detail. FIGS. 1-6 highlight examples of the lighting module enclosure component, which may also be shown in other figures. The enclosure 134 may substantially protect one or more of the components located within the interior space of the enclosure 134. The enclosure 134 may include various aspects, such as a base enclosure 138, a light source enclosure 136, and other enclosures 134 that would be appreciated by a person of skill in the art after having the benefit of this disclosure. The light source components 112 may be at least partially included within the interior of the light source enclosure 136. At least part of the electrical component 120 may be at least partially included within the interior of the base enclosure 138.

A light source enclosure 136 may be located at a first end of the enclosure 134, near the light source component 112. The light source enclosure 136 may be at least partially transparent or translucent, such that light emitted from the light source component 112 may pass through a portion of a light source enclosure 136 to the user.

The enclosure 134 may additionally include a base enclosure 138 to cover at least part of the electrical component 120 at a second end of the enclosure 134, which may be opposite the first end of the enclosure. The mounting component 140 may be connected to the enclosure 134 at the base enclosure 138 portion at the second end. Skilled artisans will appreciate that the mounting component 140 may be connected to the enclosure 134 at other locations, without limitation.

A charging interface 124 may be included on the enclosure 134 to receive an electrical charging connector, such as a dock charging connector 168. The charging interface 124 may optionally be included on the base enclosure 138 and/or the light source enclosure 136. The charging interface 124 may optionally include one or more commonly used connection port, for example, a USB port.

The light source enclosure 136 may include a light source enclosure first end 133 locatable approximately adjacent to the base component 130. The light source enclosure 136 may additionally include a light source enclosure second end 135 located distal to the light source enclosure first end 133. One or more light source enclosure side surfaces may extend outwardly from the light source enclosure first end 133 to the light source enclosure second end 135 to substantially enclose a light source enclosure space at least partially within the confines of the light source enclosure 136.

In one embodiment, the light source enclosure 136 may be substantially cylindrical. However, those of skill in the art will appreciate that virtually any size or shape may be used to construct a light source enclosure 136. The light source enclosure 136 may include a substantially flat surface at the light source enclosure second end 135 to facilitate emission of light in a desired direction. Inclusion of a substantially flat light source enclosure second end surface may additionally facilitate installation of the lighting module 110 that includes the light source enclosure to a dock base 150.

The base enclosure 138 may include a base enclosure first end 137 locatable approximately adjacent to the light source component 112. The base enclosure 138 may additionally include a base enclosure second end 139 located distal to the base enclosure first end 137. One or more base enclosure side surfaces may extend outwardly from the base enclosure first end 137 to the base enclosure second end 139 to substantially enclose a base enclosure space at least partially within the confines of the base enclosure 138.

In one embodiment, the base enclosure 138 may be substantially cylindrical. However, those of skill in the art will appreciate that virtually any size or shape may be used to construct a base enclosure 138. The base enclosure 138 may include a substantially flat surface at the base enclosure second end 139 to facilitate installation of a mounting component 140. Inclusion of a substantially flat base enclosure second end surface may additionally facilitate mounting of the lighting module 110 that includes the base enclosure 138 to a surface 148.

The base enclosure 138 may substantially connect to the light source enclosure 136. For example, the base enclosure first end 137 of the base enclosure 138 and the light source first end 133 of the light source enclosure 136 may be configured to receive one another to form a substantially sealed connection. Illustrative connection interfaces may include threading, adhesive, welding, pressure fitting, locking tabs, clips, or other connective interfaces that would be appreciated by a person of skill in the art after having the benefit of this disclosure. A base seal 132 may optionally be included between or about the connection of the base enclosure 138 and the light source enclosure 136 to substantially prevent introduction of moisture and/or other undesired elements into the interior space of the base enclosure 138 and/or light source enclosures 134. In some embodiments, the interior of the light source enclosure 136 and the base enclosure 138 may be at least partially connected.

The base enclosure 138 may include an interface to receive and/or otherwise install a mounting component 140. In some embodiments, the mounting component 140 may be installed to the base enclosure 138 via threading, adhesive, welding, pressure fitting, locking tabs, clips, or other connective interfaces that would be appreciated by a person of skill in the art after having the benefit of this disclosure.

In some embodiments, at least part of the electrical component 120 may additionally be included within the interior of the light source enclosure 136. For example, a charging interface 124 may be provided by the light source component 112, which may be at least partially accessible through the light source enclosure 136.

The light source enclosure 136 may be constructed using a material that may at least partially transmit light. In some embodiments, the light source enclosure 136 may be substantially transparent, translucent, or otherwise capable of transmitting light through the material.

The light source component 112 will now be discussed in greater detail. FIGS. 1-3, 5, and 6 highlight examples of the light source component 112, which may also be shown in other figures. The light source component 112 of the lighting modules 110 may include LEDs 114 and/or other light sources. In some configurations, the light source component 112 may include multiple LEDs 114. The light source component 112 may be oriented to direct light at the user.

The light source component 112 may include a light source to provide illumination. For example, the light source component 112 may include one or more LEDs 114. In additional embodiments, the light source component 112 may include incandescent lighting, fluorescent lighting, laser-based lighting, and other light sources that would be apparent to a person of skill in the art after having the benefit of this disclosure. The light source component 112 may include multiple light sources, for example, multiple LEDs 114.

In at least one embodiment, LEDs 114 are selected for their low energy consumption, relative highlight output, and overall efficiency. Multiple LEDs 114 may be included by the light source component 112 to provide enhanced lighting characteristics of the lighting module 110. High-current LEDs may be included to emit more light from each LED. In some embodiments, a combination of high-current and low-current LEDs may be included by the light source component 112 to provide adaptability of desired lighting characteristics. In an additional embodiment, one or more colored LEDs may be included to affect the emitted light to provide a desired color characteristic.

The light source component 112 may be operatively connected to a charging interface 124 to facilitate docking with a dock base 150. The charging interface 124 may be positioned such that it can be easily received by the dock base 150. For example, the light source enclosure 136 that includes the light source component 112 may provide access to the charging component such that it is compatible with a dock charging connector 168 of an associated dock base 150.

The base component and lighting module electrical component will now be discussed in greater detail. FIGS. 1-3, 5, and 6 highlight examples of the base component 130, lighting module electrical component 120, and other aspects, which may also be shown in other figures.

The electrical component 120 of the lighting module 110 may include a battery 122, power control circuitry 126, a switch, dimming control, and a charging interface 124, and other aspects that would be appreciated by a person stone yard after having the benefit of this disclosure. The battery 122 may be a rechargeable battery 122. The power control circuitry 126 may assist in powering the lighting module 110 during operation, charging the battery 122 when connected to an electrical supply, and monitoring that the operation of the module is conduced within substantially safe parameters. The battery 122 may be charged using a proprietary connector, USB-based connector, dock base 150, lighting module receiving interface 160, and/or other connection. In one configuration, the batteries may be user replaceable.

The lighting module 110 may include the electrical component 120 to facilitate operation of the light source component 112 to illuminate a space. At least part of the electrical component 120 may be installed in the base component 130 of the lighting module 110. In some embodiments, at least part of the electric component may additionally be installed in the light source component 112 of the lighting module 110. Skilled artisans will appreciate additional configurations including an electrical component 120, without limitation.

The electrical component 120 may include a battery 122, which may provide electrical power to one or more other aspects of the lighting module 110. For example, electrical power may be drawn from the battery 122 to drive one or more of the light sources included by the light source module. The battery 122 may optionally be user-replaceable. In some embodiments, the battery 122 may be configured with a custom size to fit within the base component 130 or another component of the lighting module 110.

The battery 122 may be constructed using primary cells, which are typically not rechargeable. The battery 122 may alternatively be constructed using secondary cells, which are typically rechargeable. Other battery types includable by the electrical component 120 would be appreciated by a person of skill in the art after having the benefit of this disclosure. Illustrative primary cell batteries may include alkaline batteries, lithium batteries, aluminum-air batteries, dry cell batteries, and/or other primary cell batteries. Illustrative secondary cell batteries may include lithium ion batteries, nickel cadmium batteries, nickel hydrogen batteries, nickel-iron batteries, nickel metal-hydride batteries, nickel zinc batteries, and/or other secondary cell batteries.

The electrical component 120 may additionally include a charging interface 124, which may supply electrical power to charge the battery 122, drive a light source included by the light source component 112, and/or otherwise power an aspect of the lighting module 110. The charging interface 124 may be installed into the lighting module 110 such that an access port is provided through at least part of the enclosure 134. In one embodiment, the charging interface 124 may be accessible through at least part of the base enclosure 138. In an additional embodiment, the charging interface 124 may be accessible through at least part of the light source enclosure 136, for example, a second end of the light source enclosure 136. Optionally, multiple charging interfaces 124 may be included by the lighting module 110 to provide flexibility to a user.

The charging interface 124 may receive a compatible power delivery cable, dongle, extension, or other power delivery structure configured to be received by the charging interface 124. In one example, the charging interface 124 may receive a compatible connection at least partially compliant with a universal serial bus ("USB") standard. Available USB standards may include USB 1.X, USB 2.0, USB 3.0, USB 3.1, and/or future USB standards that will be appreciated by persons of skill in the art after having the benefit of this disclosure. Various USB connection sizes and shapes may be used that are compatible with the charging interface 124 of the lighting module 110. For example, compatible sizes and shapes may include Type-A, Type-B, Type-A mini, Type-B mini, Type-A micro, Type-B micro, Type-C, UC-E6, non-standard USB connections, Super-Speed connections, and/or future USB-compatible connection, shapes, and sizes that would be appreciated by a person of skill in the art after having the benefit of this disclosure.

The electrical component 120 may include power control circuitry 126 to at least partially adapt power received from the charging interface 124 and/or stored by the battery 122 such to be used by the light source component 112. For example, in an embodiment using LEDs as a light source, the power control circuitry 126 may condition the power drawn from the battery 122 to the desirable voltage and current specified by the LEDs.

The power control circuitry 126 may additionally manage the storage of electrical power by the battery 122. For example, the power control circuitry 126 may control the voltage and/or current received by the charging interface 124 and condition the power such that it may be stored by the battery 122. The power control circuitry 126 may additionally determine a level of electrical charge stored by the battery 122 and/or prevent overcharging of the battery 122.

The power control circuitry 126 may interface with a power switch 128 to at least partially control whether the light source is in an on or off state. In embodiments including dimmable light sources, the power control circuitry 126 may control the intensity of light emitted by the light source component 112. In an embodiment including light emission with adjustable color characteristics, the power control circuitry 126 may affect the power used to drive color light sources and/or white light sources of the light source component 112 to affect the combined color of the light emitted by the light source component 112.

The mounting component 140 will now be discussed in greater detail. FIGS. 1, 2, and 4-6 highlight examples of the mounting component 140, which may also be shown in other figures. The mounting component 140 may include a pressure differential component, such as a suction cup 142, to temporarily attach the lighting module 110 to a surface 148. For example, a suction cup 142 may be located opposite the light source component 112 to stick the lighting module 110 to a mirror, thus directing the light at the user. The suction cup 142 may interact with a suction variance control lever, which may increase the suction between the lighting module 110 and the surface 148 to provide stronger attachment.

The mounting component 140 may be included by the lighting module 110 to facilitate mounting the lighting module 110 to a mounting face of a surface 148. The mounting component 140 may include an interface by which the lighting module 110 may attach to the surface 148. In one embodiment, the mounting component 140 may include a suction cup 142. However, those of skill in the art will appreciate additional mounting aspects that may be included by the mounting component, such as hook and loop fasteners, adhesive, glue, sticky substances, magnets, and/or other attachment aspects.

In an example of a mounting component 140 including a suction cup 142, the mounting component 140 may additionally include and/or interact with a suction cup variance control 144. For example, a suction cup variance control 144 lever may be provided by the base component 130 to adjust the volume provided under the suction cup 142. By manipulating the suction cup variance control 144, a user may increase the volume between a suction cup 142 and attached surface 148, thereby increasing the suction included in this volume and strengthening the attachment of the lighting module to the mounting surface 148.

Figure 1:
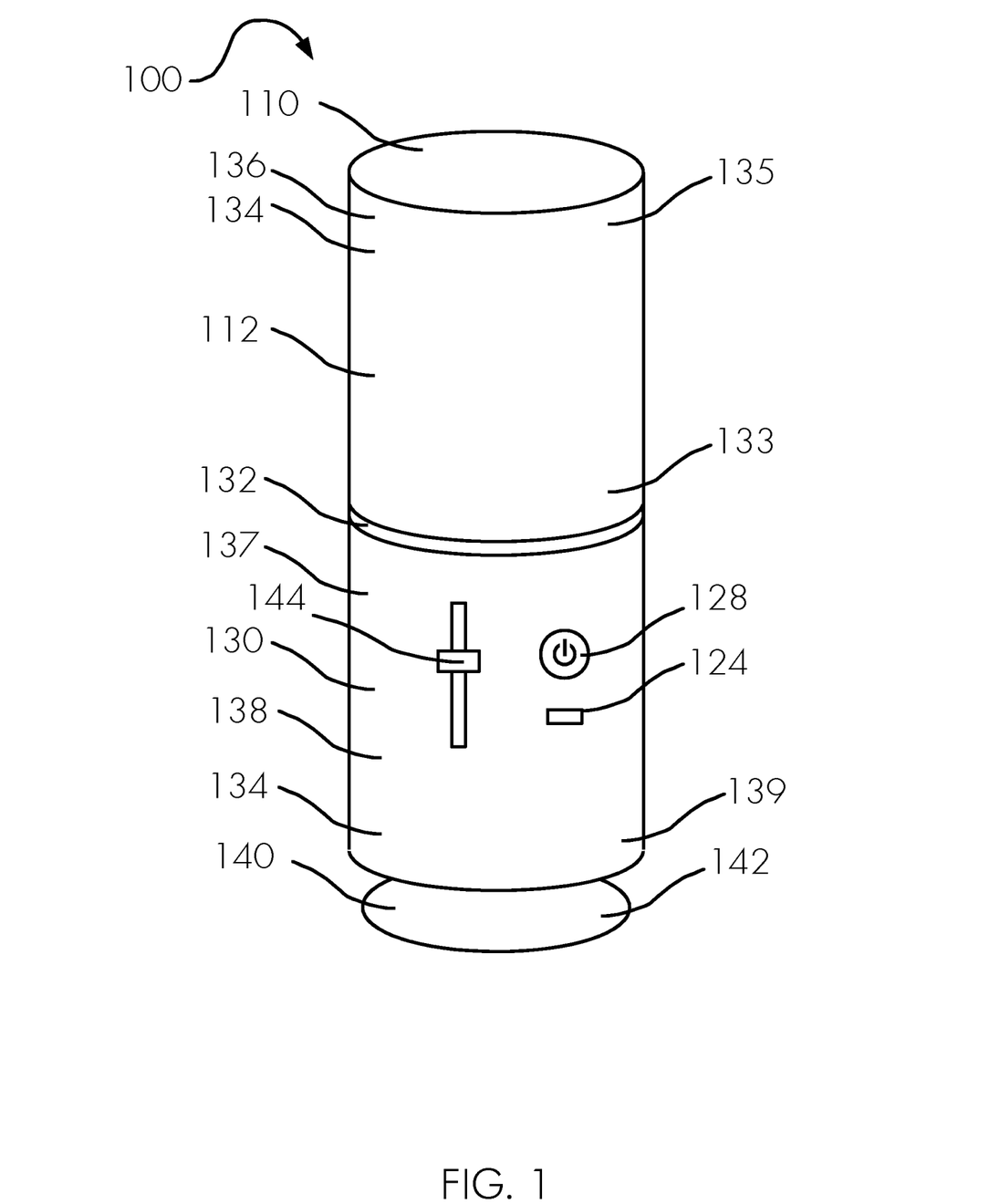
FIG. 1 is a perspective view of an illustrative lighting module, according to an embodiment of this disclosure.
Figure 2:
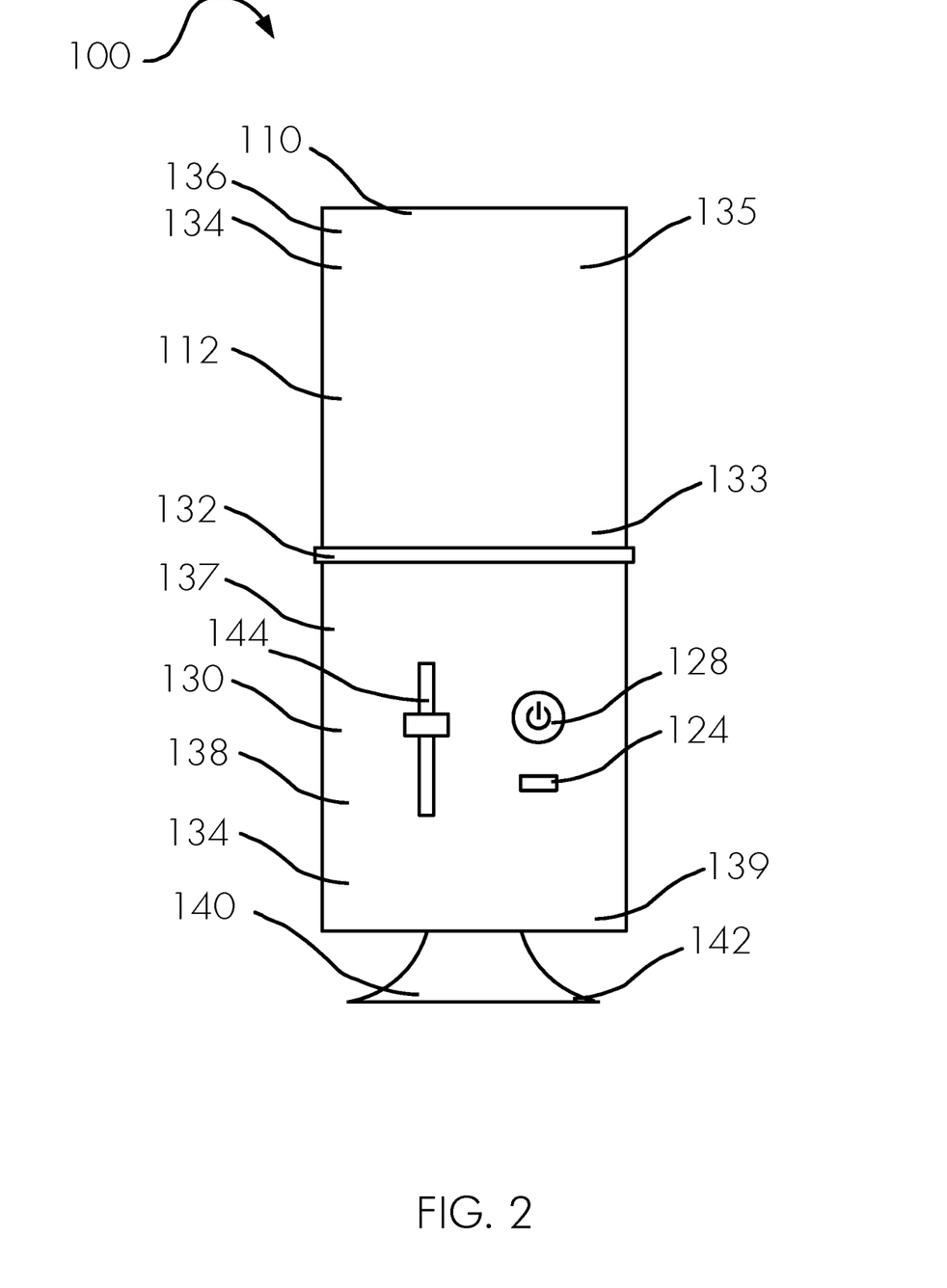
FIG. 2 is a side elevation view of an illustrative lighting module, according to an embodiment of this disclosure.
Figure 3:
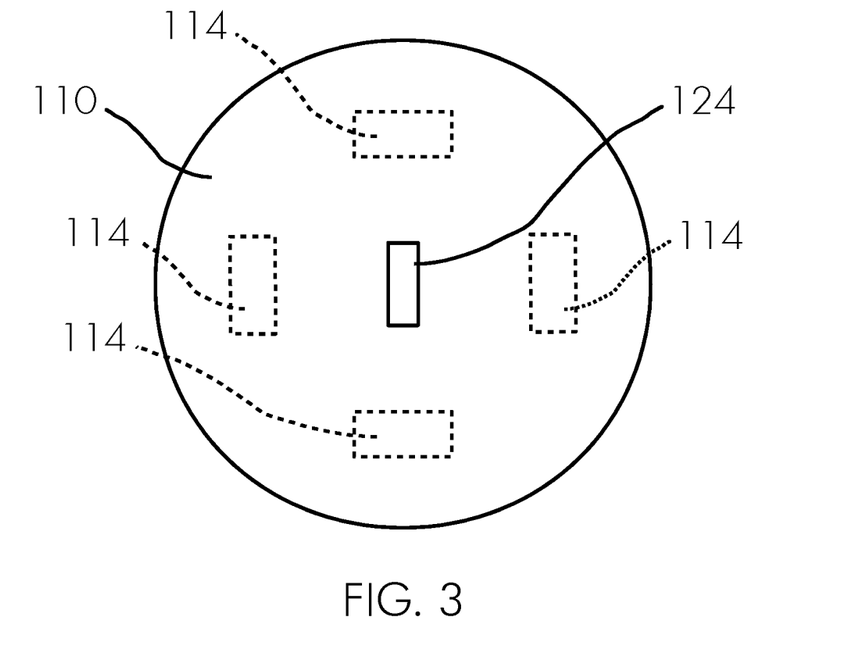
FIG. 3 is a top plan view of an illustrative lighting module, according to an embodiment of this disclosure.
Figure 4:
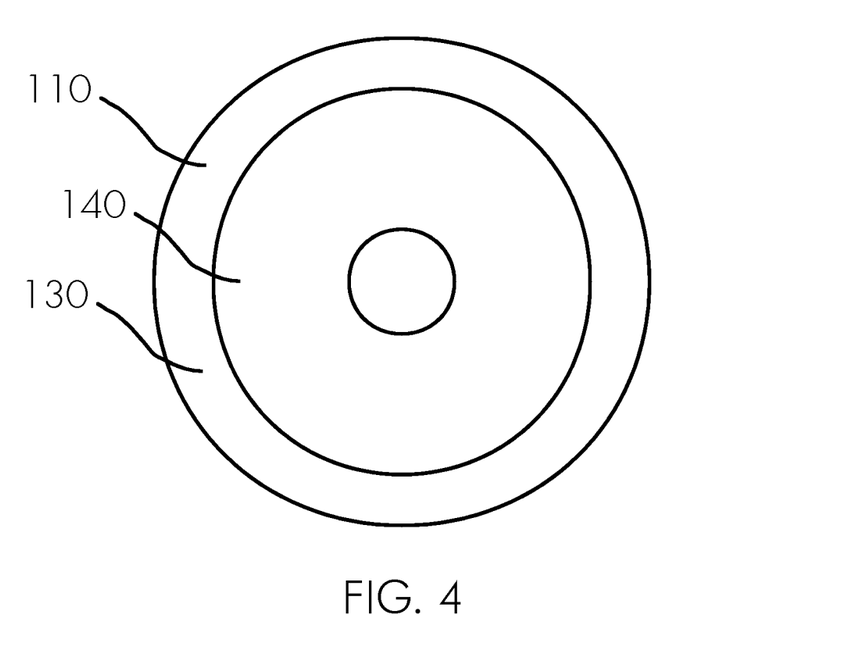
FIG. 4 is a bottom plan view of an illustrative lighting module, according to an embodiment of this disclosure.
Figure 5:
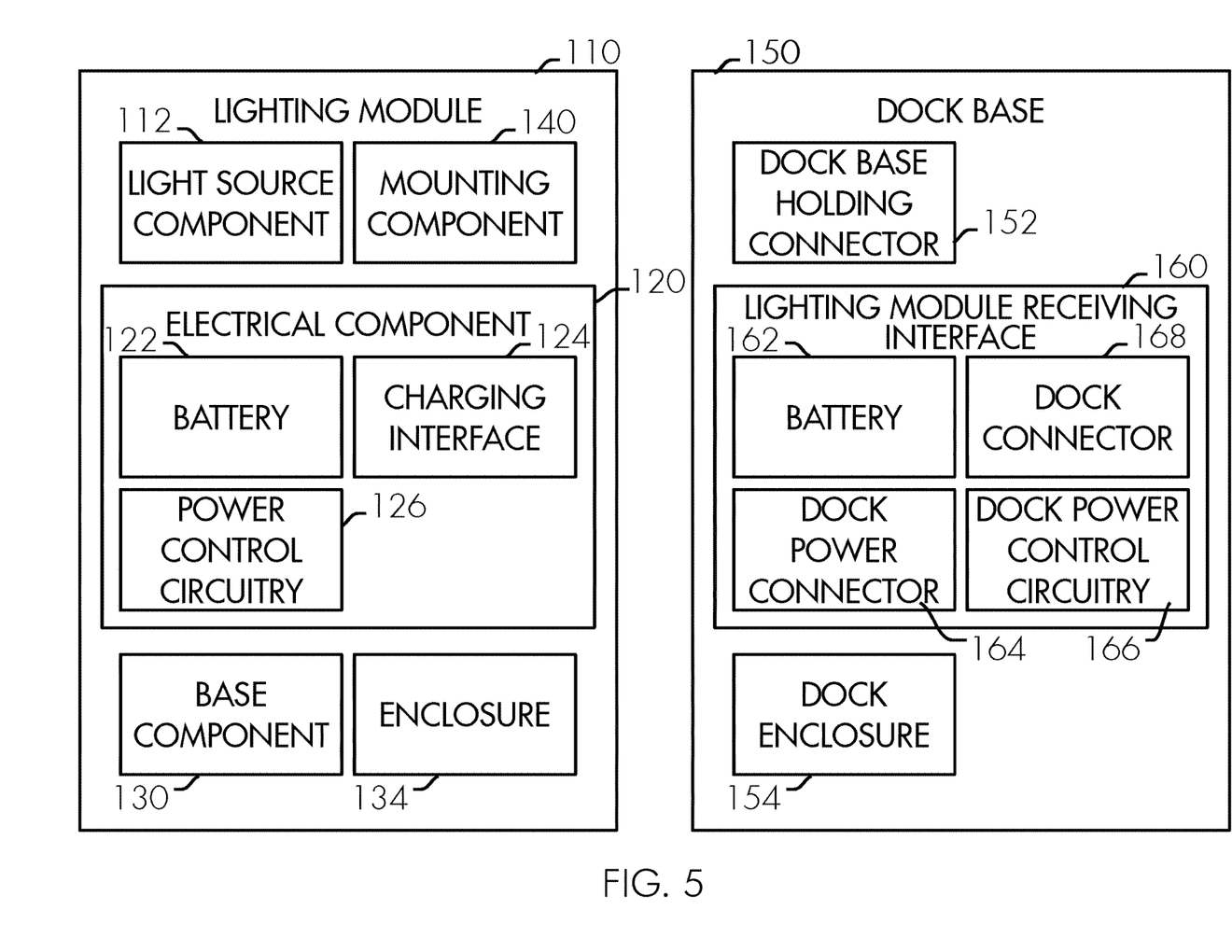
FIG. 5 is a block diagram view of an illustrative lighting module, according to an embodiment of this disclosure.
Figure 6:
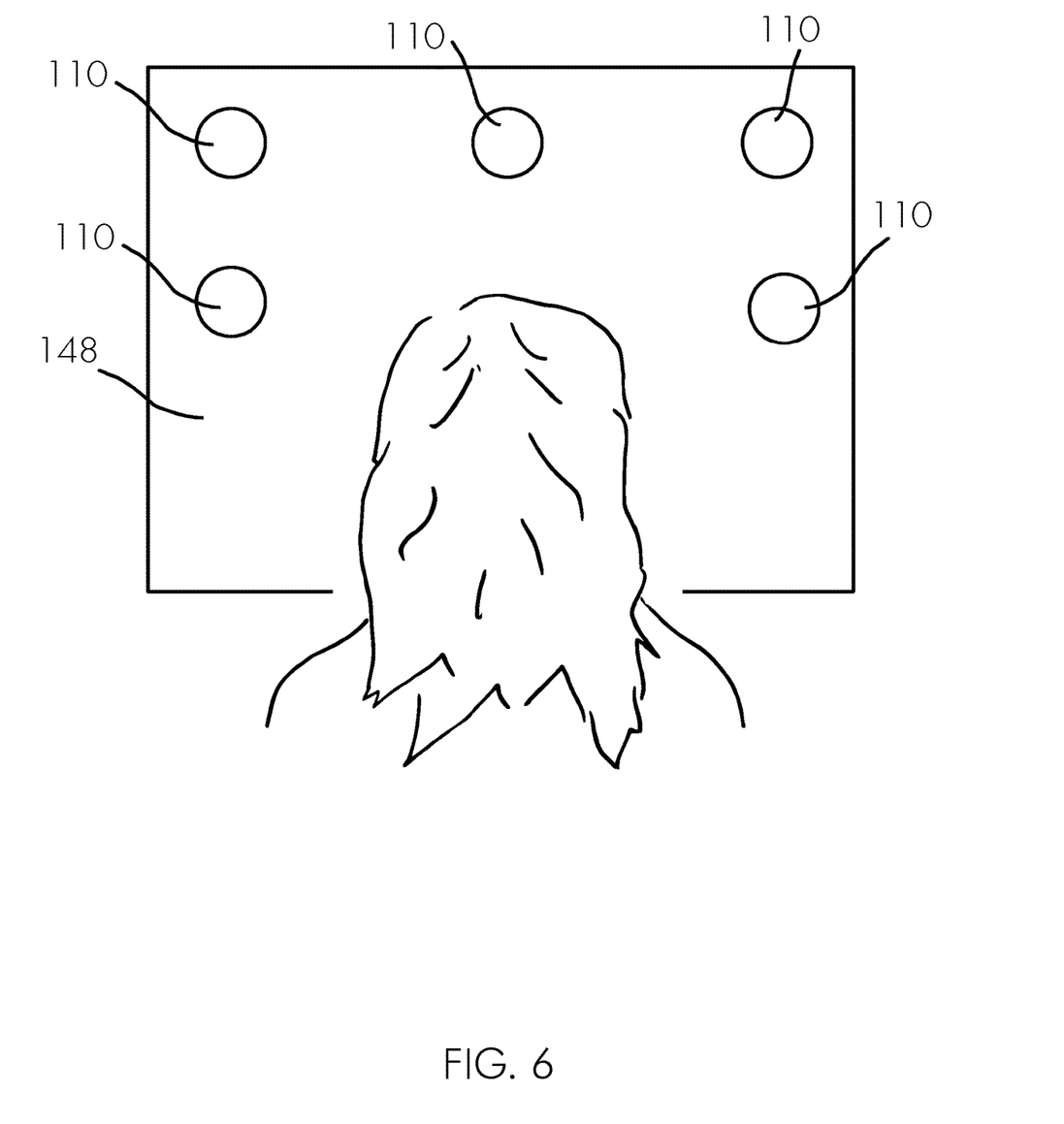
FIG. 6 is a perspective view of illustrative lighting modules mounted to a surface, according to an embodiment of this disclosure.
Figure 7:
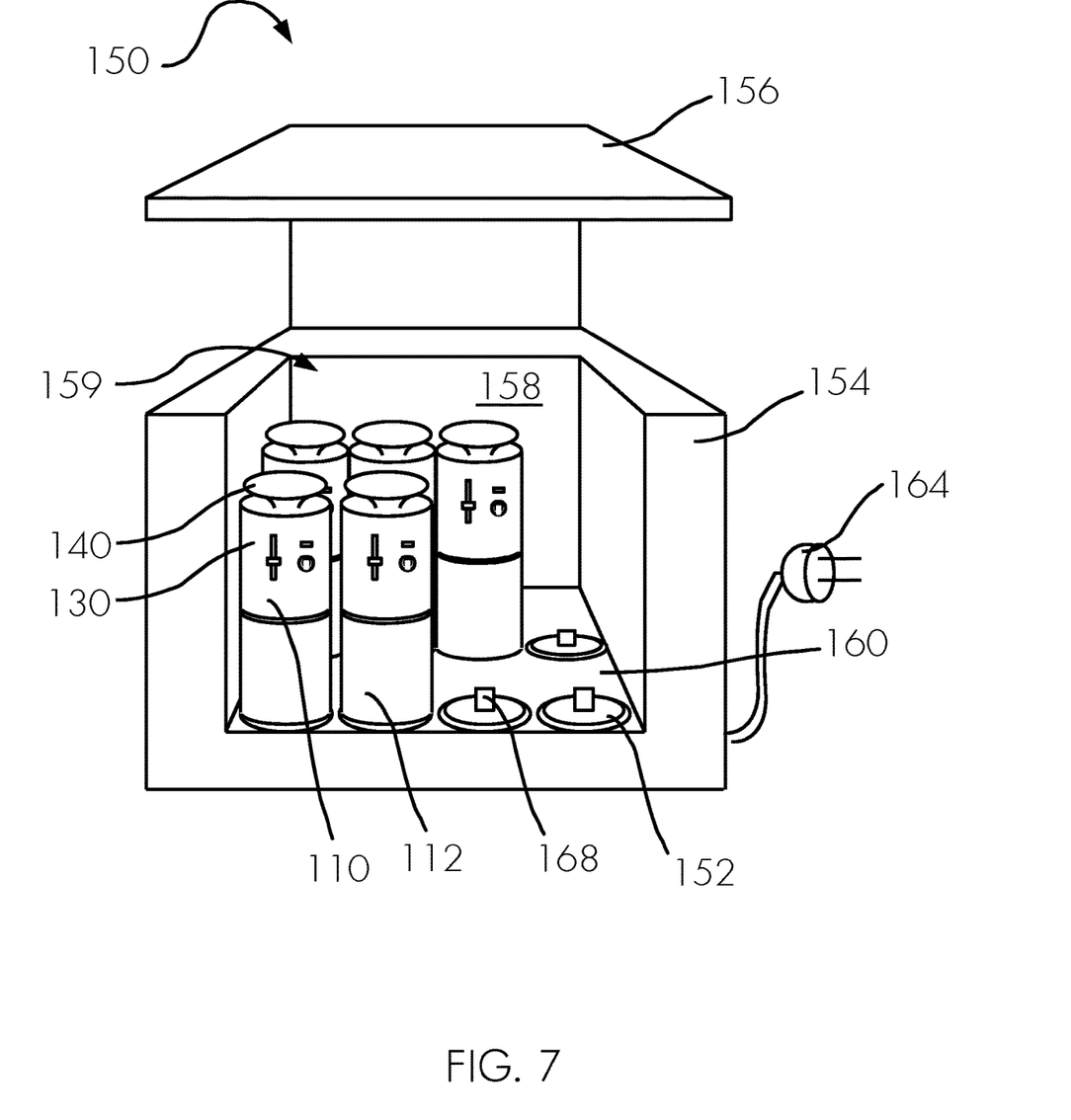
FIG. 7 is a perspective view of an illustrative dock base for carrying and charging the lighting modules, according to an embodiment of this disclosure.

The dock base 150 will now be discussed in greater detail. FIGS. 5 and 7 highlight examples of the dock base 150, which may also be shown in other figures. A dock base 150 may be included to store, carry, and/or optionally charge one or more lighting modules 110 held by the dock base 150. The dock base 150 may include the dock base holding connector 152, dock enclosure 154, lighting module receiving interface 160, and/or other components. The lighting module receiving interface 160 may include a battery 162, dock power connection 164, dock power control circuitry 166, dock connector, and/or other aspects.

The lighting module receiving interface 160 may facilitate providing electrical power to a lighting module 110 held by the dock base 150. The lighting module receiving interface 160 may be installed on a bottom interior dock base surface of the dock base 150. The lighting module receiving interface 160 may optionally include a battery 162 to store additional power that can be delivered to one or more connected lighting modules 110. Additional embodiments of the lighting module receiving interface 160 may optionally omit the battery 162. Examples of illustrative batteries includable by the lighting module receiving interface 160 are discussed in detail by this disclosure.

The lighting module receiving interface of the dock base, including a dock base electrical component, will now be discussed in greater detail. FIGS. 5 and 7 highlight examples of the lighting module receiving interface, which may also be shown in other figures. The lighting module receiving interface 160 may additionally include a dock power connection 164 to facilitate drawing power from an external power source. In one embodiment, the dock power connection 164 may be provided by a standard power cord and outlet plug, which may connect to an external power source provided by a main electrical grid. In alternative embodiments, the dock power connection 164 may be provided by a custom and/or proprietary power transmission medium and interface. The dock power connection 164 may be at least partially retractable into an interior volume of the dock base 150, which may advantageously facilitate traveling with the dock base 150.

The lighting module receiving interface 160 may additionally include dock power control circuitry 166 to facilitate providing electrical power to a lighting module 110 held by the lighting module receiving interface 160 of the dock base 150. The dock base power control circuitry 166 may at least partially adapt power received from the dock power connection 164 and/or stored by the dock base battery such to be used with a held lighting module 110.

The dock base power control circuitry 166 may additionally manage the storage of electrical power by the dock base battery 162. For example, the dock base power control circuitry 166 may control the voltage and/or current received by the dock power connection 164 and condition the power such that it may be stored by the dock base battery 162 and/or delivered to a held lighting module 110. The dock base power control circuitry 166 may additionally determine a level of electrical charge stored by a connected lighting module battery 122 and/or prevent overcharging of the lighting module battery 122. Similarly, the dock base power control circuitry 166 may additionally determine a level of electrical charge stored by the dock base battery 162 and/or prevent overcharging of the dock base battery 162. The dock base power control circuitry may interface with a dock base power switch to at least partially control whether to provide electrical power to other components.

The lighting module receiving interface 160 of the dock base 150 may further include a dock charging connector 168. The dock charging connector 168 may be configured such that it is compatible with a charging interface 124 of a lighting module 110 to be held by the lighting module receiving interface 160. In one example, the dock base charging connector 168 may be at least partially inserted into the charging interface 124 of a lighting module 110 received by the lighting module receiving interface 160 to provide electrical charge to the lighting module 110. In this example, a lighting module 110 held by the dock base 150 via the lighting module receiving interface 160 may be charged while it is stored by the dock base 150. This combination of charging and storing of lighting modules 110 by the dock base 150 may advantageously facilitate keeping the lighting modules 110 charged so that the lighting modules 110 may be used without inconvenience when a user is desiring additional light to illuminate space.

The lighting module receiving interface 160 may receive multiple lighting modules 110 substantially simultaneously. In at least one embodiment, the lighting module 110 receiving interface may hold and charge multiple lighting modules 110 collectively. The lighting module receiving interface 160 may operate to hold and/or provide electrical power to lighting modules 110 if one or more lighting module 110 is received by the lighting module receiving interface 160. In this example, the lighting module receiving interface 160 may charge one or more lighting modules 110, even if not all dock base charging connectors 168 are connected to a respective charging interface 124 of a lighting module 110.

The dock base enclosure will now be discussed in greater detail. FIGS. 5 and 7 highlight examples of the dock enclosure 154, which may also be shown in other figures. The dock enclosure 154 may at least partially enclose an interior dock space 158 within the dock base 150. The interior dock space 158 may be accessible via a dock enclosure access interface 159. In one embodiment, the dock enclosure 154 may include a bottom surface, a top surface, and one or more wall surfaces extending between at least part of the bottom surface and at least part of the top surface. The top surface may at least partially be provided by a dock base holding cover 156. In one example, the dock base holding cover 156 may be removably locatable over the dock enclosure access interface 159 to substantially enclose the dock base interior dock space 158 and protect contents stored within the dock base 150.

The dock base holding connector 152 will now be discussed in greater detail. FIGS. 5 and 7 highlight examples of the dock base holding connector 152, which may also be shown in other figures. The dock base 150 may include a dock base holding connector 152, which may facilitate receiving and/or holding a lighting module 110. The dock base holding connector 152 may include one or more features to substantially secure the lighting module 110 by the dock base 150. The dock base holding connector 152 may additionally include one or more features to allow removal of a held lighting module 110, for example, when a user may desire to place a lighting module 110 on a surface 148 to illuminate a space. In at least one embodiment, the enclosure 134 of the lighting module 110 may include compatible interface features to facilitate being held by the dock base holding connector 152.

In operation, a method may be provided to illuminating a space using removably mountable lighting modules 110. Those of skill in the art will appreciate that the following methods are provided to illustrate an embodiment of the disclosure, and should not be viewed as limiting the disclosure to only those methods or aspects. Skilled artisans will appreciate additional methods within the scope and spirit of the disclosure for performing the operations provided by the examples below after having the benefit of this disclosure. Such additional methods are intended to be included by this disclosure.

Figure 8:
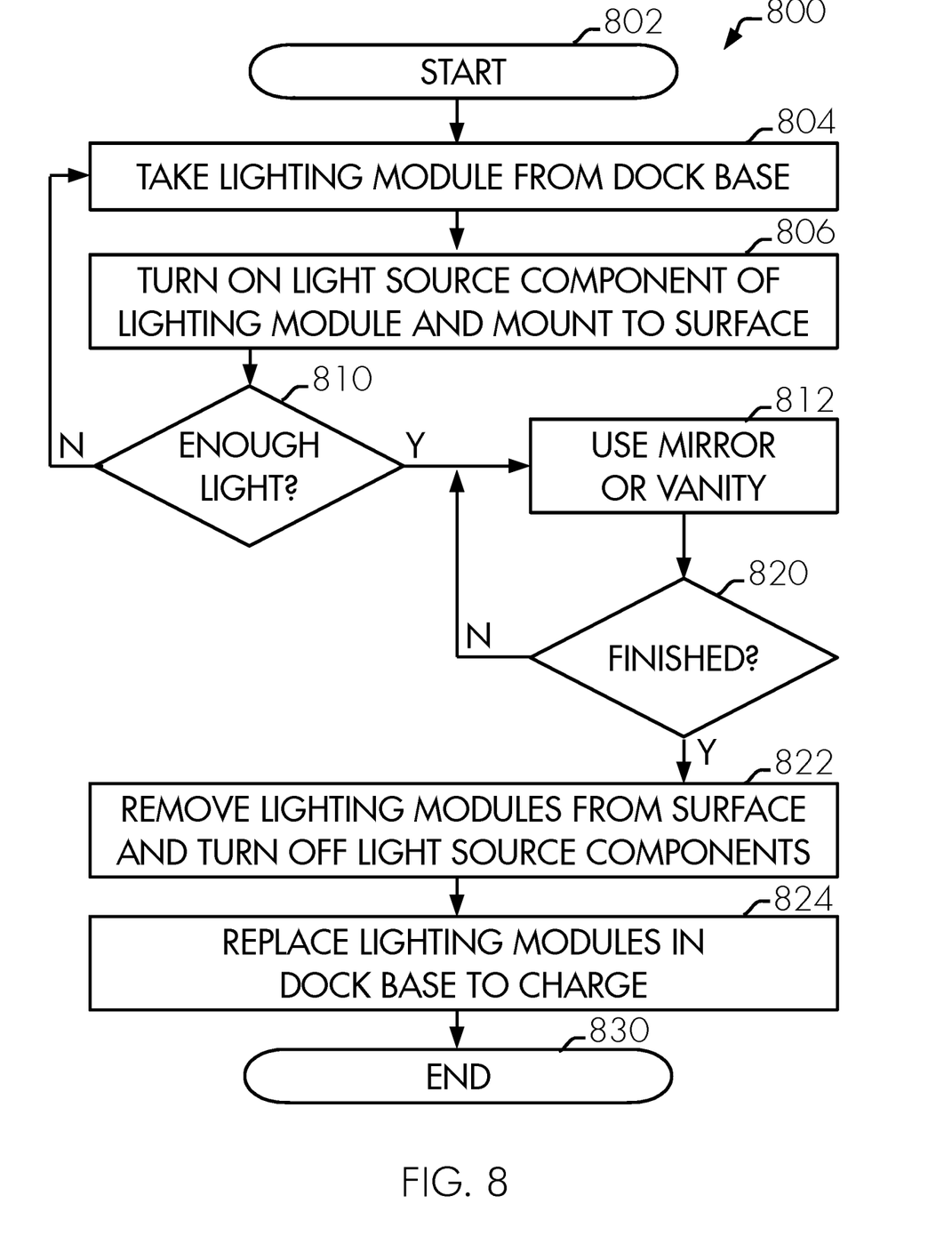
FIG. 8 is a flow chart view of an illustrative mounting operation, according to an embodiment of this disclosure.

Referring now to flowchart 800 of FIG. 8, an illustrative method for a mounting and operation will be described, without limitation. Starting with block 802, the operation may begin by taking a lighting module from the dock base. (Block 804). The user may then turn on the light source component of the lighting module and mount the lighting module to a surface. (Block 806).

It may then be determined whether enough light is provided by the number of lighting modules mounted to the surface. (Block 810). If it is determined at Block 810 that not enough light is provided, the user may return to the operation of Block 804 and take another lighting module from the dock base. If it is determined at Block 810 that enough light is provided to illuminate a space, the user may proceed to use the mirror, vanity, or other space illuminated by the lighting modules. (Block 812).

It may then be determined whether the user is finished Illuminating the space. (Block 820). If it is determined at Block 820 that the user is not finished illuminating the space, the user may continue to perform the operation of Block 812 by using the mirror, vanity, or otherwise illuminating the space. If it is determined at Block 820 that the user is finished illuminating the space, the user may remove the lighting modules from the surface and turn off the light source components of the lighting modules. (Block 822). The user may then replace the lighting modules in the dock base to recharge. (Block 824). The operation may then terminate at Block 830.

While various aspects have been described in the above disclosure, the description of this disclosure is intended to illustrate and not limit the scope of the invention. The invention is defined by the scope of the appended claims and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the following claims.

What is claimed is:

1. A lighting system comprising:
a lighting module comprising:
a light source component to selectively emit light and oriented in a fixed position to direct the light away from a mounting face of a surface upon which the lighting module is mounted, the light source component comprising high-current light emitting diodes,
an electrical component comprising:
a battery to store electrical power,
a charging interface to receive the electrical power for storage by the battery, and
power control circuitry interfaced with physically connected inputs to manage storing and extracting the electrical power via the battery,
a base component operatively attached to the light source component, at least part of the electrical component being installable in the base component, wherein a base seal is included between the base component and the light source component, wherein the base component comprises a suction cup variance control lever, and
a mounting component operatively attached to the base component for removably mounting the lighting module to the surface, wherein said mounting component comprises a suction cup to provide adjustable suction between the lighting module and the surface by manipulating the suction cup variance control lever;
wherein power control circuitry selectively dims the light source to affect an intensity of the light emitted by the light source component.

2. The lighting system of claim 1, further comprising:
a dock base comprising:
a lighting module receiving interface about a bottom interior dock base surface of the dock base, and
a dock enclosure substantially encompassing an interior dock space accessible via a dock enclosure access interface.

3. The lighting system of claim 2, the dock base further comprising:
a dock charging connector integrated into the lighting module receiving interface of the dock base;
dock power control circuitry to at least provide the electrical power to the lighting module received by the lighting module receiving interface; and
a dock power connection to receive the electrical power for the dock base from an external power source.

4. The lighting system of claim 2, the dock base further comprising:
a dock base holding connector to substantially keep the lighting module received by the dock base to the dock base, the lighting module being substantially kept by the dock base holding connector also being removable from the dock base holding connectors; and
wherein the dock base further comprises a carrying case.

5. The lighting system of claim 1, wherein the charging interface is at least partially compatible with a universal serial bus standard and accessible via a top surface of the light source component facing a same direction as the mounting surface to which the lighting module is mounted.

6. The lighting system of claim 1, further comprising:
an enclosure comprising:
a light source enclosure in which the light source component is fixedly installed, the light emitted by the light source component being at least partially transmittable through the light source enclosure;
a base enclosure into which at least part of the electrical component is installable and onto which the mounting component is installable;
wherein the light source enclosure is operatively attachable to the base enclosure.

7. A lighting system comprising:
a lighting module comprising:
a light source component comprising high-current light emitting diodes and low-current light emitting diodes to selectively emit light,
an electrical component comprising:
a battery to store electrical power,
a charging interface to receive the electrical power for storage by the battery, and
power control circuitry interfaced with physically connected inputs to manage storing and extracting the electrical power via the battery,
a base component operatively attached to the light source component, at least part of the electrical component being installable in the base component, wherein a base seal is included between the base component and the light source component, wherein the base component comprises a suction cup variance control lever,
a mounting component operatively attached to the base component for removably mounting the lighting module to a surface, wherein said mounting component comprises a suction cup to provide adjustable suction between the lighting module and the surface by manipulating the suction cup variance control lever; and
a dock base comprising:
a lighting module receiving interface about a bottom interior dock base surface of the dock base,
a dock enclosure substantially encompassing an interior dock space accessible via a dock enclosure access interface,
a dock charging connector integrated into the lighting module receiving interface of the dock base, and
dock power control circuitry to at least provide the electrical power to the lighting module received by the lighting module receiving interface;
wherein the power control circuitry selectively dims the light source to affect an intensity of light emitted by the light source component.

8. The lighting system of claim 7, the dock base further comprising:
a dock battery to store at least part of the electrical power providable to the lighting module operatively connected to the lighting module receiving interface.

9. The lighting system of claim 7, the dock base further comprising:
a dock base holding connector to substantially keep the lighting module received by the dock base to the dock base, the lighting module being substantially kept by the dock base holding connector also being removable from the dock base holding connector;
wherein the dock base further comprises a carrying case.

10. The lighting system of claim 7, the light source component further comprising:
a light emitting diode oriented to direct the light away from a mounting face of the surface upon which the lighting module is mounted.

11. The lighting system of claim 7, further comprising:
an enclosure comprising:
a light source enclosure in which the light source component is included, the light emitted by the light source component being at least partially transmittable through the light source enclosure, and
a base enclosure into which at least part of the electrical component is installable and onto which the mounting component is installable; and
wherein the light source enclosure is operatively attachable to the base enclosure;
wherein the charging interface is accessible via a top surface of the light source component facing a same direction as the mounting surface to which the lighting module is mounted.

12. A method of removably mounting and using a lighting system comprising a lighting module, the method comprising:
(a) removably mounting the lighting module comprising a light source component comprising high-current light emitting diodes, a base component, and a mounting component by operatively attaching the mounting component to a mounting face of a surface;
(b) engaging an electrical component comprising a battery for storing electrical power, a charging interface for receiving the electrical power, and power control circuitry interfaced with physically connected inputs for managing and extracting the electrical power via the battery to drive the light source component, wherein the power control circuitry selectively dims the light source to affect an intensity of the light emitted by the light source component; and
(c) selectively emitting the light away from the mounting face and in a fixed direction toward a user of the lighting system;
wherein the base component is operatively attached to the light source component and a base seal is included between the base component and the light source component, wherein the base component comprises a suction cup variance control lever;
wherein the mounting component is operatively attached to the base component for removably mounting the lighting module to the surface,
wherein said mounting component comprises a suction cup to provide adjustable suction between the lighting module and the surface by manipulating the suction cup variance control lever.

13. The method of claim 12, further comprising before step (a):
(d) removing the lighting module from a dock base comprising a lighting module receiving interface about a bottom interior dock base surface of the dock base.

14. The method of claim 13, further comprising:
(e) while the lighting module is held by the dock base comprising a dock charging connector integrated into the lighting module receiving interface:
(i) providing the electrical power to the lighting module received by the lighting module receiving interface via dock power control circuitry, and
(ii) receiving the electrical power for the dock base from an external power source.

15. The method of claim 14, further comprising:
(f) storing at least part of the electrical power via a dock battery providable to the lighting module operatively connected to the lighting module receiving interface.

16. The method of claim 13, further comprising:
(g) substantially keeping the lighting module received by the dock base to the dock base via a dock base holding connector; and
wherein the lighting module substantially kept by the dock base holding connector is selectively removable from the dock base holding connector; and
wherein the dock base further comprises a carrying case.

17. The method of claim 12, wherein step (a) further comprises:
(i) positioning the lighting module near the surface on which to be mounted;
(ii) physically pressing the suction cup against the surface; and
(iii) manipulating the suction cup variance control lever to affect the adjustable suction between the lighting module and the surface.

18. The lighting system of claim 1 wherein the light source comprises low-current light emitting diodes and the high-current light emitting diodes.

* * * * *